US005368797A

United States Patent [19]

Quentin et al.

[11] Patent Number: 5,368,797

[45] Date of Patent: Nov. 29, 1994

[54] METHOD FOR MAKING A COVER ASSEMBLY FOR USE ON AN INTERNAL COMBUSTION ENGINE

[75] Inventors: Werner Quentin, Burscheid; Bernd Stephan, Remscheid-Lennep, both of Germany

[73] Assignee: Goetze AG, Burscheid, Germany

[21] Appl. No.: 990,507

[22] Filed: Dec. 15, 1992

[30] Foreign Application Priority Data

Dec. 17, 1991 [DE] Germany .............................. 4141576
Jul. 2, 1992 [DE] Germany .............................. 4221760

[51] Int. Cl.5 .............................................. B29C 45/14

[52] U.S. Cl. ...................................... 264/152; 29/416; 29/418; 29/888.01; 264/163; 264/273; 264/274; 264/277

[58] Field of Search ............... 264/152, 163, 273, 274, 264/277; 123/90.38, 195 C; 29/416, 418, 888.01

[56] References Cited

U.S. PATENT DOCUMENTS

| | | | |
|---|---|---|---|
| 2,323,216 | 6/1943 | Goldschmidt | 29/416 |
| 2,828,095 | 3/1958 | Beck et al. | 248/612 |
| 4,206,931 | 6/1980 | Tomita et al. | 277/166 |
| 4,394,853 | 7/1983 | Lopez-Crevillen et al. | 123/195 C |
| 4,495,903 | 1/1985 | Asano | 123/90.38 |
| 4,719,892 | 1/1988 | Lopez-Crevillen | 29/416 |
| 4,819,953 | 4/1989 | Joh | 277/235 B |
| 4,965,933 | 10/1990 | Mraz et al. | 264/163 |
| 5,054,562 | 10/1991 | Honsa et al. | 173/139 |

FOREIGN PATENT DOCUMENTS

| | | |
|---|---|---|
| 237205 | 4/1991 | European Pat. Off. . |
| 2723459 | 1/1978 | Germany . |
| 2638982 | 3/1978 | Germany . |
| 3143042 | 6/1982 | Germany . |
| 3512713 | 10/1986 | Germany . |
| 3701540 | 5/1988 | Germany . |
| 3639218 | 1/1990 | Germany . |
| 8717964 | 12/1991 | Germany . |
| 372711 | 5/1932 | United Kingdom . |
| 1263077 | 2/1972 | United Kingdom . |

*Primary Examiner*—Jay H. Woo
*Assistant Examiner*—Robert B. Davis
*Attorney, Agent, or Firm*—Spencer, Frank & Schneider

[57] ABSTRACT

A cover assembly for an internal combustion engine includes sleeves that are connected with a cover member by rubber bodies. The rubber bodies decouple the cover member from structure-borne sound from the engine. Depending on its configuration, the cover assembly may be used as an oil pan or a valve hood. The cover assembly is made from a cover blank which includes the cover member, the sleeves, and webs which connect the sleeves to the cover member. The cover blank is placed in a mold. The webs break and the sleeves are axially displaced with respect to the cover member as the mold is closed. An elastomer material is then injected into the mold to form the rubber bodies.

11 Claims, 3 Drawing Sheets

METHOD FOR MAKING A COVER ASSEMBLY FOR USE ON AN INTERNAL COMBUSTION ENGINE

BACKGROUND OF THE INVENTION

The present invention relates to a cover assembly, particularly a cover assembly for an internal combustion engine, with the cover assembly including a flange, openings for the passage of fastening screws, and sound insulating elastomer bodies provided in the openings.

Due to its complex structure and mode of operation, an internal combustion engine generates noise, some of which is caused by components that are connected with the engine but are not power transmitting components. Examples include valve covers and oil pans. In an attempt to reduce noise it has been found to be an effective measure to fasten these components so that they are insulated against structure-borne sound.

DE-OS (German Unexamined Published Patent Application) 2,723,459 discloses an internal combustion engine in which an oil pan is connected to the crankcase in a manner insulated against structure-borne sound-The fastening screws for the oil pan are embedded in elastomer bodies having guide rings which extend into the openings for the fastening screws. In order to protect the elastomer bodies against excess stresses, fixed abutments are provided at the oil pan and at the housing of the internal combustion engine.

One drawback of this structure is that during installation of the oil pan, the biasing force of the seal and of the elastomer bodies is set by way of the fastening screws, in that the screws are screwed into the housing to the end of their threads. Since the rigidity of the individual elastomer bodies may differ it is not possible to set them all optimally, particularly if there are a plurality of elastomer bodies distributed over the periphery of the housing but the threaded portions of the screws are always of the same length. Moreover, the individual elastomer bodies must all be produced as separate components in a vulcanization mold and must also be installed individually. If there are vertical vibrations, the abutments may hit against one another, thus enabling the transmission of structure-borne sound.

In a cylinder head cover for an internal combustion engine as disclosed in German Patent 3,639,218 (corresponding to U.S. Pat. No. 4,819,953), elastomer bodies are pressed into the openings for the fastening screws in order to provide for insulation against structure-borne sound. In this arrangement as well, the elastomer bodies are manufactured separately and pressed into the openings in an additional process step. The thread-free section of the fastening screw serves as a path-limiting member for setting the biasing force of the seal.

SUMMARY OF THE INVENTION

It is an object of the present invention to further improve a cover of this type with respect to automatic installation, and to provide a cover assembly that is simpler and thus more economical to install while simultaneously making the cover assembly recyclable.

This is accomplished by the present invention in that cylindrical sleeves are provided to accommodate the fastening screws. Each sleeve is connected with a cover member in a form-locking or interlocked manner by way of a form-fitting body of an elastomeric material such as rubber. As a result, the fastening screws are unable to exert axial pressure on the elements provided for insulation against structure-borne sound, so that tightening of the fastening screws does not change the bias in the rubber.

According to a further aspect of the invention, the cover assembly is made from a cover blank which includes the sleeves and a cover member portion, the sleeves being connected to the rest of the blank (i.e., the cover member portion) at respective break-away locations. In this way, the sleeves can be introduced into a molding tool as part of the blank. In order to install the rubber bodies, the sleeves are broken away from the cover member portion of the blank while inside the mold, and rubber is then injected to form the rubber bodies.

It is particularly economical to configure the cover blank in this way, with the cover member portion of the blank and the sleeves being provided as a unitary component having break locations. This makes it possible, for example in connection with a cover assembly of a light metal, to manufacture the sleeves together with the cover member portion of the blank in a casting mold. The sleeves, which in this way are held captive on the cover member portion, then need no longer be produced separately. It is particularly favorable to dispose the break locations at respective connecting webs between the outer circumferential surfaces of the respective sleeves and the inner circumferential surfaces of the respective openings.

The firm connections between the sleeves and the cover member portion of the blank are broken by axially displacing the sleeves. For a cover assembly which is equipped with a vulcanized-on static seal, it is possible, when the cover blank is placed into the vulcanizing mold, to release the sleeves from the cover member portion of the blank by way of the break locations by pressing the sleeves axially into the openings with the aid of the molding tool. The rubber bodies can be installed during the same process step by injecting the material for the static seal. If the connecting web is configured as a closed annular web and if it is additionally disposed in the end region of the opening adjacent a flange which is provided on the blank, the broken-off remainder of the annular web, once the sleeve and the cover member portion of the blank have been separated, constitutes an undercut with the advantage that the injected rubber body can be placed in the opening without the addition of adhesion promoting agents. The thus-produced form-locking connection (i.e., the elements are interlocked, being shaped so that their surfaces conform with one another to lock the elements together by virtue of their respective forms) can be released again in a simple manner. Thus the cover assembly meets the requirement of being easily recyclable.

Additionally, each sleeve is provided with a safety means which permits a corresponding screw to be held captive on the cover assembly. A constriction is provided in the end region that is oriented toward the screw head so that the screw can be screwed into the sleeve. Thus all individual cover assembly components can be installed together as a unit by a single automatic manipulator.

In order to improve damping characteristics, the interior circumferential surface of each opening and the exterior circumferential surface of the corresponding sleeve are preferably given a conical configuration.

DESCRIPTION OF THE PREFERRED EMBODIMENTS

Figure 1:
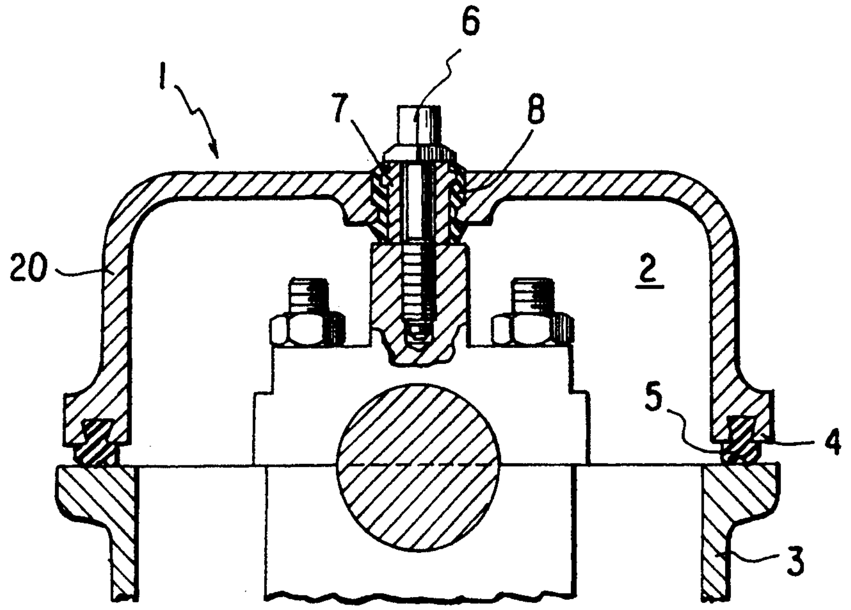
FIG. 1 is a front view of a cover assembly according to a first embodiment of the invention, seen in cross section in the installed state.

The cover assembly 1 shown in FIG. 1 includes a cover member 20 which is composed of aluminum. The cover assembly 1 serves to cover the valve chamber 2 of the engine block 3 of an internal combustion engine. The cover member 20 is provided with a flange 4 in order to accommodate a static seal 5 of elastomer material. The cover assembly 1 is fixed to the engine block 3 by a plurality of fastening screws 6 (only one of which is shown) disposed in the bottom of the cover assembly. The screws 6 extend through sleeves 7 (only one of which is shown) that are connected with the cover member 1 by bodies 8 (only one of which is shown) that are made of an elastomer material such as rubber and that provide insulation against structure-borne sound. Rubber body 8 is connected with the sleeve 7 in an interlocked or form-locking manner, that is, the rubber body 8 can easily be removed from the cover member 20.

Figure 2:
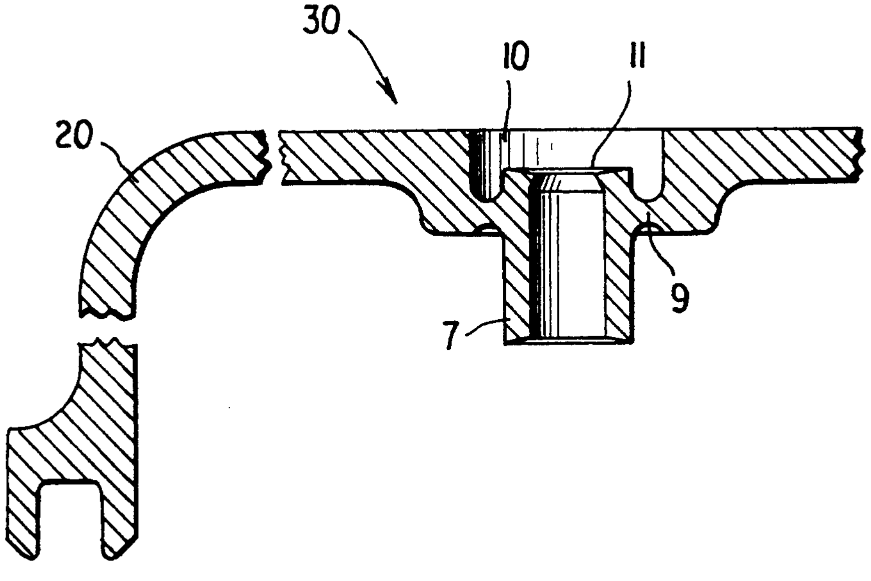
FIG. 2 is a cross-sectional view showing a portion of the cover blank that is used during fabrication of the cover assembly shown in FIG. 1.

FIG. 2 shows part of an aluminum blank 30 that is used during fabrication of cover assembly 1. Sleeve 7 is configured as a part of the cover blank 30, that is, the sleeve 7 was included along with cover member 20 when the cover blank 30 was cast in a casting mold. The connection between cover member 20 and sleeve 7 is established by way of a thin, circumferential, closed annular web 9, which is configured as a desired break location. The blank 30 has an opening 10 where the sleeve 7 is disposed with an axially offset orientation. In order for the fastening screw 6 to be held captive at the sleeve 7, the end region 11 of the sleeve 7 is constricted. In order to install the rubber body 8, sleeve 7 is pressed axially into opening 10. This process may take place in a vulcanization tool during the closing process.

Figure 3:
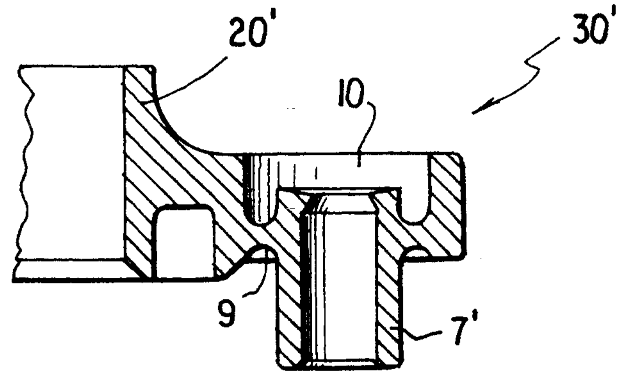
FIG. 3 is cross-sectional view showing a portion of a cover blank that is used during fabrication of a second embodiment of the cover assembly of the invention.
Figure 4:
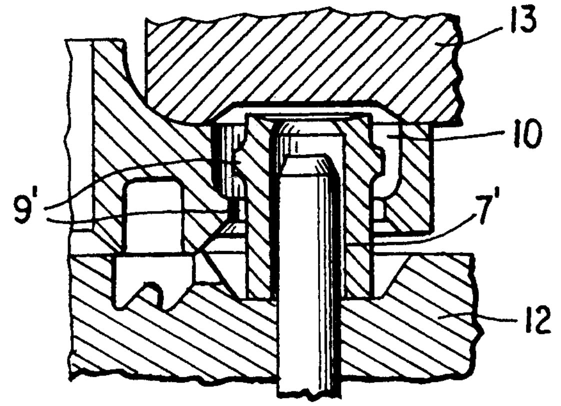
FIG. 4 is a cross-sectional view showing the portion of the cover blank that is depicted in FIG. 3 within a molding tool.
Figure 5:
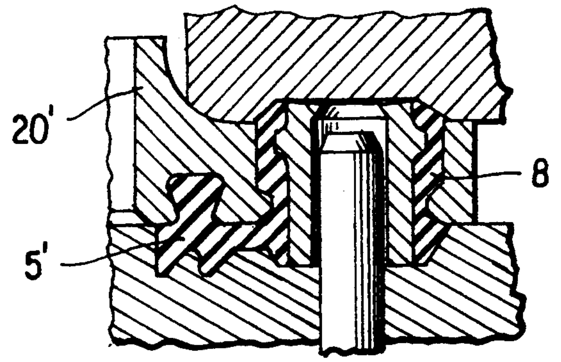
FIG. 5 shows the arrangement depicted in FIG. 4 after rubber has been injected into the molding tool.
Figure 6:
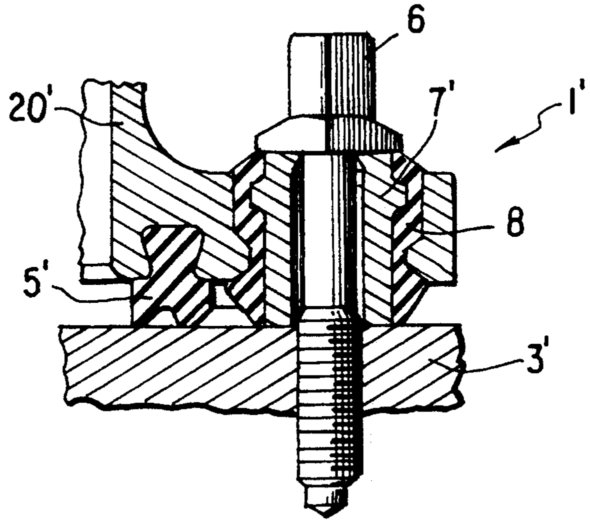
FIG. 6 is a cross-sectional view showing a portion of the second embodiment of the cover assembly in its installed state.

FIGS. 3 to 5 shows this process during fabrication of a modified cover assembly 1', part of which is illustrated in FIG. 6. The cover assembly 1' may be used as a cover for the valve chamber of an internal combustion engine. As is shown in FIG. 3, the cover blank 30' that is used to make cover assembly 1' includes a cover member portion 20' and sleeves 7' (only one of which is shown). The sleeves 7' project axially from openings 10 (only one of which is shown). The openings 10 for the fastening screws are merely moved from the bottom of the cover assembly (in the embodiment of FIGS. 1 and 2) to the edge of the cover assembly (in the embodiment of FIGS. 3–6).

Cover blank 30' is initially positioned on the lower half 12 of a molding tool (FIG. 4). The cover blank 30' is then pressed axially by the upper half 13 of the molding tool, and the desired break location at annular web 9 is broken. Further closing of the mold urges sleeve 7' into the opening 10 relative to cover member 20'.

Breaking the annular web 9 leaves the annular stumps 9' on sleeve 7' and cover member 20'. It will be apparent that the outer diameter of the stump 9' on sleeve 7' is the same as the inner diameter of the stump 9' on cover member 20'. Furthermore the breaking of annular web 9 and subsequent displacement of sleeve 7' with respect to cover member 20' creates an annular gap between the outer circumferential face of sleeve 7' and the inner circumferential face of opening 10. Due to its geometrical shape, this annular gap is suitable for connecting rubber body 8 with cover portion 20' in a form-locking or interlocked manner. An elastomeric material is injected into the mold to form a seal 5' and the rubber body 8 at the same time in one process step (FIG. 5).

In this way it is possible to connect all components required for installation of the cover assembly 1' in a captive manner.

FIG. 6 shows an installed cover assembly 1' in which all attached components, such as screw 6, sleeve 7', rubber body 8, and the static seal 5, form a component group that remains connected when the cover assembly 1' is removed from engine block 3'.

Figure 7:
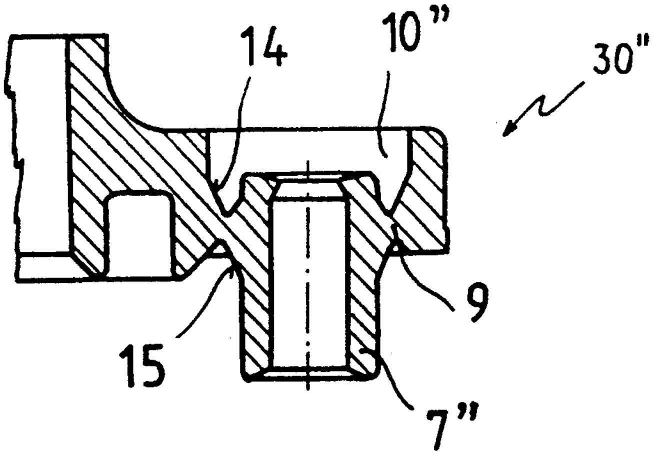
FIG. 7 is a cross-sectional view showing a portion of a cover blank that is used during fabrication of a third embodiment of the cover assembly of the invention.

FIG. 7 shows a portion of a cover blank 30'' having a modified opening 10''. Above the web 9, which provides the desired break location, opening 10'' has a conically extending inner circumferential face 14. Sleeve 7'' is also given a conical configuration 15 below the web 9.

Figure 8:
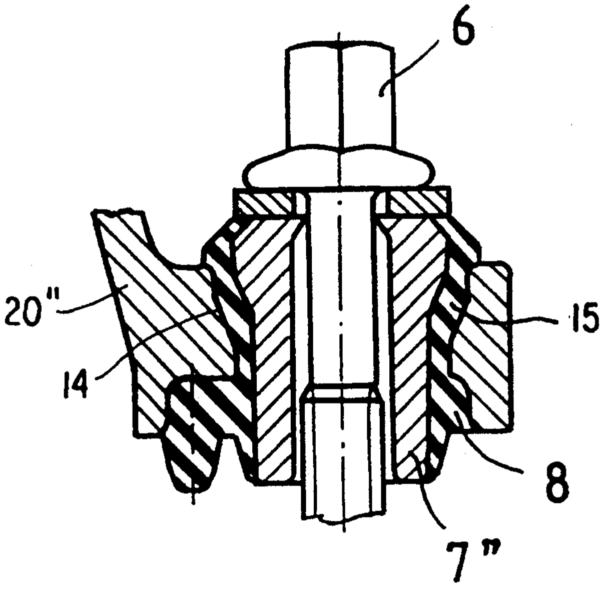
FIG. 8 is a cross-sectional view showing a portion of the third embodiment of the cover assembly.

The result of this measure is that, in the installed state according to FIG. 8, the rubber body 8 is progressively deformed between the two conical circumferential faces (14, 15) if there is relative axial movement between sleeve 7'' and cover member 20''. In this way, the spring characteristic can be changed and can thus be set optimally for the required conditions. Depending on the intended application, hard or soft damping can be set in that the conical faces 14 and 15 are oriented at a steeper or flatter angle. The conical faces 14 and 15 are preferably parallel to each other as shown.

It will be understood that the above description of the present invention is susceptible to various modifications, changes, and adaptations, and the same are intended to be comprehended within the meaning and range of equivalents of the appended claims.

What is claimed is:

1. A method for making a cover assembly which is insulated against structure-borne sound from an object on which the cover assembly is mounted by screws, comprising the steps of:

(a) placing a cover blank between first and second molding tools of a mold, the cover blank including a cover member portion and a plurality of tubular sleeves that are joined to the cover member portion;

(b) moving the molding tools together to close the mold and detach the sleeves from the cover member portion of the cover blank, the detachment of the sleeves from the cover member portion leaving the cover member portion with openings through which the sleeves extend; and (c) injecting elastomer material into the closed mold to form elastomer bodies in the openings, the elastomer bodies being attached to the sleeves and being connected in a form-locking manner to the cover member position.

2. The method of claim 1, wherein the cover blank is a unitary component having break locations between the sleeves and the cover member portion, and further comprising the step of making the cover blank before step (a) is conducted.

3. The method of claim 1, wherein the cover blank includes webs connecting the sleeves to the cover member portion, the webs providing break locations which are fractured during step (b).

4. The method of claim 3, wherein the sleeves of the cover blank have respective longitudinal axes, and wherein the sleeves are displaced axially during step (b) to fracture the break locations.

5. The method of claim 3, wherein the sleeves of the cover blank have respective longitudinal axes and are connected by the webs to the cover member portion at positions that are axially offset with respect to the positions they assume after step (b) is completed.

6. The method of claim 1, wherein the cover blank includes closed, annular webs connecting the sleeves to the cover member portion, the webs providing break locations which are fractured during step (b).

7. The method of claim 1, wherein the sleeves have ends, wherein the cover blank includes a flange and annular webs connecting the cover member portion to the sleeves at positions adjacent the ends of the sleeves, the webs additionally being disposed adjacent the flange, and wherein the webs provide break locations which are fractured during step (b).

8. A method for making a cover assembly which is insulated against structure-borne sound from an object on which the cover assembly is mounted by screws, comprising the steps of:

(a) placing a cover blank between first and second molding tools of a mold, the cover blank including a cover member portion and a plurality of tubular sleeves that are joined to the cover member portion;

(b) moving the molding tools together to close the mold and detach the sleeves from the cover member portion of the cover blank, the detachment of the sleeves from the cover member portion leaving the cover member portion with openings through which the sleeves extend; and (c) injecting elastomer material into the closed mold to form elastomer bodies in the openings, the elastomer bodies connecting the sleeves to the cover member portion, and to simultaneously form an elongated seal which is mounted on the cover member and which runs adjacent the elastomer bodies.

9. The method of claim 8, wherein the cover blank is a unitary component having break locations between the sleeves and the cover member portion, the sleeves being broken from the cover member portion at the break locations when step (b) is conducted.

10. The method of claim 8, wherein the cover blank includes annular webs connecting the sleeves to the cover member portion, the webs providing break locations which are fractured during step (b).

11. The method of claim 10, wherein the sleeves of the cover blank have respective longitudinal axes, and wherein the sleeves are displaced axially during step (b) to fracture the break locations.

* * * * *